US006819489B2

(12) United States Patent  
Harris

(10) Patent No.: US 6,819,489 B2
(45) Date of Patent: Nov. 16, 2004

(54) METHOD AND SYSTEM FOR DISPLAYING THREE-DIMENSIONAL IMAGES

(75) Inventor: Richard H. Harris, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/374,241

(22) Filed: Feb. 25, 2003

(65) Prior Publication Data

US 2004/0165265 A1 Aug. 26, 2004

(51) Int. Cl.[7] .................... G02B 27/22; H04N 13/04
(52) U.S. Cl. .................. 359/464; 359/462; 359/463; 359/466; 348/56; 348/59
(58) Field of Search ................. 359/462, 463, 359/464, 466, 630; 348/56, 59

(56) References Cited

U.S. PATENT DOCUMENTS

| 624,042 | A | 5/1899 | Jacobson |
| 2,301,254 | A | 11/1942 | Carnahan |
| 2,317,875 | A | 4/1943 | Athey |
| 2,820,395 | A | 1/1958 | Rehorn |
| 3,439,972 | A | 4/1969 | Ratliff, Jr. |
| 4,367,486 | A | 1/1983 | Eichenlaub |
| 4,717,949 | A | 1/1988 | Eichenlaub |
| 4,807,965 | A | 2/1989 | Garakani |
| 4,829,365 | A | 5/1989 | Eichenlaub |
| 4,853,769 | A | 8/1989 | Kollin |
| 5,349,379 | A | 9/1994 | Eichenlaub |
| 5,537,144 | A | 7/1996 | Faris |
| 5,680,171 | A | 10/1997 | Lo et al. |
| 5,712,732 | A | * 1/1998 | Street .................. 359/630 |
| 5,757,545 | A | * 5/1998 | Wu et al. ............. 359/463 |
| 5,875,055 | A | 2/1999 | Morishima et al. |
| 5,943,166 | A | 8/1999 | Hoshi et al. |
| 5,973,831 | A | 10/1999 | Kleinberger et al. |
| 6,188,518 | B1 | * 2/2001 | Martin .................. 359/464 |
| 2003/0161040 | A1 | * 8/2003 | Ishii et al. ............. 359/463 |

FOREIGN PATENT DOCUMENTS

AU 663041 9/1995

* cited by examiner

*Primary Examiner*—Audrey Chang
(74) *Attorney, Agent, or Firm*—Jeanine S. Ray-Yarletts; Sawyer Law Group

(57) ABSTRACT

Apparatus and method for displaying three-dimensional images with a display device. A blocking grid is positioned between a display device and a viewer, and a drive system oscillates the blocking grid in accordance with the display of a plurality of images. Each image is aligned with the grid and is structured such that each eye of the viewer sees only a displayed portion of a displayed image intended for that eye, thereby creating a three-dimensional effect.

35 Claims, 7 Drawing Sheets

METHOD AND SYSTEM FOR DISPLAYING THREE-DIMENSIONAL IMAGES

FIELD OF THE INVENTION

The present invention relates to displays that provide three-dimensional images to a viewer and more particularly to methods and devices that allow a two-dimensional display to provide three-dimensional images from a single display.

BACKGROUND OF THE INVENTION

Two dimensional images are commonly displayed on flat display devices, such as cathode ray tubes (CRTs). However, there is also a need to view images of three dimensions, or of apparently three dimensions. For example, applications of gaming, merchandising, mechanical design, entertainment, etc., all have a use for three-dimensional images which allow a user to see objects and images having greater realism.

Several types of devices have been devised to meet this need. One type of device allows the left eye and right eye of a viewer to see slightly different images to provide the effect that the viewed image is in three dimensions, corresponding to depth perception. One image corresponds to what the left eye should see, and the other image corresponds to what the right eye should see, so that the images differ in perspective by the distance between the viewer's eyes and create the three dimensional effect.

Different images can easily be provided for each eye if two displays are used, one for each eye. However, if a viewer is viewing one display, the display of different images for each eye is not as straightforward. One device that can provide this effect for a single display is 3-D glasses, which the user wears over his eyes to allow an eye to see its corresponding image on the display, but not allow the eye to see the image intended for the other eye. For example, some types of 3-D glasses provide filters which filter out a specific color of the image for one eye that is intended for the other eye, where the displayed image has been specially prepared so that each of the two colors in the image corresponds to what the corresponding eye would see. Other types of glasses may provide polarizing lenses or electronic shutters that allow each eye to only see the image intended for it on the display.

However, 3-D glasses can be inconvenient or cumbersome to wear for the user. Some devices have been devised to allow the viewing of 3-D images on a single display without glasses. For example, some devices impose a grid of vertical strips between the viewer and the display, and an image is displayed which has two different images corresponding to the vertical strips so that each eye of the viewer sees the corresponding image. But the existing devices for providing the blocking grid are expensive, such as Liquid Crystal Display (LCD) shutters, and require sophisticated manufacturing processes, thereby providing a significant obstacle in a low-cost consumer market.

SUMMARY OF THE INVENTION

The invention of the present application provides an apparatus and method for displaying three-dimensional images with a display device. In a first aspect, an apparatus for allowing the viewing of three-dimensional images using a display device displaying two-dimensional images includes a blocking grid and a drive system. The blocking grid is positioned between the display of the display device and a viewer, and the drive system oscillates the blocking grid in accordance with the display of a plurality of images. Each image is aligned with the grid and each image is structured such that each eye of the viewer sees only a displayed portion of a displayed image intended for that eye, thereby creating a three-dimensional effect. In a second aspect, a method for providing three dimensional images using a display device capable of displaying two-dimensional images includes creating a plurality of composite images, where each composite image includes portions of two separate images, each separate image taken from the perspective of one of the eyes of a viewer. The composite images are displayed on the display device, one at a time, at a display frequency, and a blocking grid is oscillated and is positioned between the display of composite images and the viewer such that each eye of the viewer sees only the portions of the composite images that are intended for that eye. In a third aspect, a system for providing three-dimensional images includes a display device and a blocking device. The display device is capable of displaying two-dimensional images and is caused to display a plurality of composite images, where each composite image includes alternating portions of two separate images, each separate image portraying the perspective of one of the eyes of a viewer. The blocking device is positioned between the display device and the viewer and includes a grid that is oscillated in accordance with the display of the composite images. Each composite image is structured and aligned the grid such that each eye of the viewer sees only a displayed portion of the composite images intended for that eye through spaces in the grid, thereby creating a three-dimensional effect.

The present invention provides methods and apparatus for displaying three dimensional images using a single two-dimensional display, and without the need for the viewer to wear special glasses or similar device. Furthermore, the present invention can display total images for both the left eye and the right eye, with minimal amounts of the images blocked, and the apparatus is of low cost and efficient in operation.

DETAILED DESCRIPTION

The present invention relates to displays that provide three-dimensional images, and more particularly to methods and devices that allow a two-dimensional display to provide three-dimensional images from a single display without the user needing to wear goggles or other devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
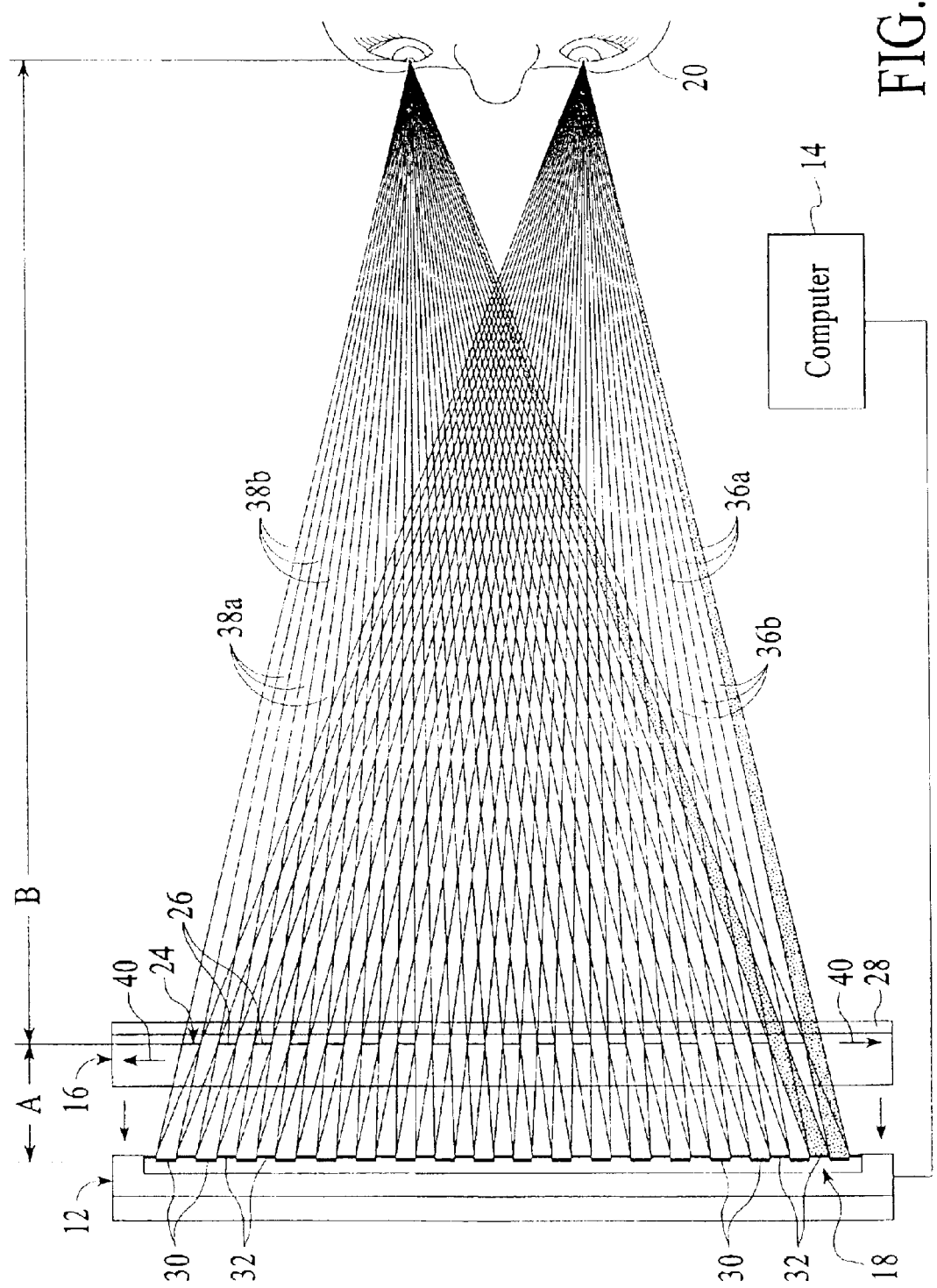
FIG. 1 is a top plan view of a display system of the present invention.

FIG. 1 is a top plan view of a display system 10 of the present invention for providing 3-D images for a viewer. Display system 10 includes a display device 12, a computer 14, and a blocking device 16. Display device 12 can be any of a variety of devices that provide images on an approximately two-dimensional display screen 18. For example, a cathode ray tube (CRT) device, liquid crystal display (LCD) device, plasma screen, projection device, television, or other suitable type of display device can be used which is available for displaying images. The display device 12 is capable of displaying a large number of individual picture elements (pixels), which together form the image that is displayed on a display screen 18 of the display device 12. A device having a high refresh rate is preferred, such as at least 60 Hz.

Computer 14 is linked to the display device 12 and controls the display of images by the display device 12. Computer 14 can be any suitable controller capable of sending appropriate signals to the display device 12 to cause the illumination of pixels of the display device to portray the desired images. For example, computer 14 can be a personal or portable computer that is connected via an I/O port to a display device 12 such as a flat screen or CRT monitor. In other embodiments, the computer 14 can be incorporated into the housing of the display device 12.

Blocking device 16 is positioned between display screen 18 of the display device 12 and a viewer 20 of images on the display screen 18 so that the blocking device 16 modifies the view of the viewer. The blocking device 16 includes a housing 22 that is preferably attached to the housing of the display device 12 so that the blocking device 16 is positioned close to the screen 18. Blocking device 16 is positioned a distance A from the screen; for clarity, FIG. 1 shows the blocking device 16 positioned a greater distance in front of the screen 18 than would actually be the case. The actual distance A is determined by multiple factors, as described below.

The blocking device 16 includes a blocking grid 24 that includes a plurality of vertically-aligned strips 26 spaced apart as shown in FIG. 1. The strips are preferably spaced apart so that the width of a strip is approximately equal to the width of the opening between each two adjacent strips. The blocking strips 26 are positioned so that particular sections or portions of an image displayed on the display screen 18 are visible to the left eye of the viewer, while other portions of the image are visible to the viewer's right eye, thereby creating an illusion of a 3-D image. A transparent protector shield 28 (e.g., of plastic or glass) is provided in front of the grid so that the grid 24 cannot be interfered with or disturbed.

The image displayed on screen 18, therefore, is a composite image composed of portions intended for the left eye and portions intended for the right eye. The composite image preferably includes alternating strips 30, where every other strip 30 belongs to a left-eye image and the remaining strips 32 belong to a right-eye image. The strips 30 and 32 of the image are shown offset from each other in FIG. 1 for illustrative purposes, and are actually displayed in a plane on the screen. The image strips 30 and 32 are of a width to correspond with the width of the blocking strips 26 and spaces therebetween. The creation of such a composite image is described in greater detail below with respect to FIGS. 2a–4h.

The positions of the image strips 30 and 32 corresponds with the positions of the strips 26 and spaces of the blocking grid 24 so that the eyes of the viewer will see the proper respective images. Thus, as shown by the imaginary rays 36a and 36b emanating from the viewer's left eye, the rays 36a are allowed to pass through the spaces (openings) in the blocking grid 24, while the rays 36b are blocked by the strips 26 in grid 24. The passage of rays 36a indicates that the left eye is able to see strips 30 of the image, which are intended for the left eye, and the blocking of rays 36b indicates that the left eye cannot see the strips 32 of the image, which are intended for the right eye. Similarly, rays 38a indicate that the user's right eye is able to see the strips 32 of the image, while rays 38b indicate that the right eye cannot see the strips 30.

Using this system, however, presents the left eye with only half the total left-eye image, and similarly presents the right eye with half the total right-eye image. Therefore, the present invention provides a blocking grid 24 that moves from side to side as shown by arrows 40, which allows each eye to see portions of the image intended for that eye that were previously not displayed. The computer 14 controls the image display to cause the image to change in accordance with the motion of the grid 24 so that each eye sees the entire image for that eye over the range of motion of the grid. For example, the frequency of changing the strips 30 and 32 of the image is matched with the frequency of oscillation of the grid 24. Thus each eye of the viewer sees an entire image from the perspective of that eye, creating a sense of depth perception and three dimensions. Embodiments for implementing this effect are described in detail below. The extent of oscillation of the blocking grid 24 need not be very large; for example, an extent of motion of 1 millimeter can be sufficient, provided that narrow enough blocking and image strips are used.

The position of the user with respect to the blocking grid and display device are important to achieve the desired three-dimensional effect. The user should be positioned at a distance B so that the views of the left and right eyes are appropriately blocked at the desired corresponding positions of the moving grid 24. The distance A of the grid from the screen and the distance B from the grid 24 to the viewer 20 are related by known trigonometric relationships. For example, one example of a suitable position for a viewer is about 20 inches in front of the grid (distance B), where distance A from the screen to the grid is about 0.27 inches. Different positions and distances can be alternatively implemented.

Figure 2A:
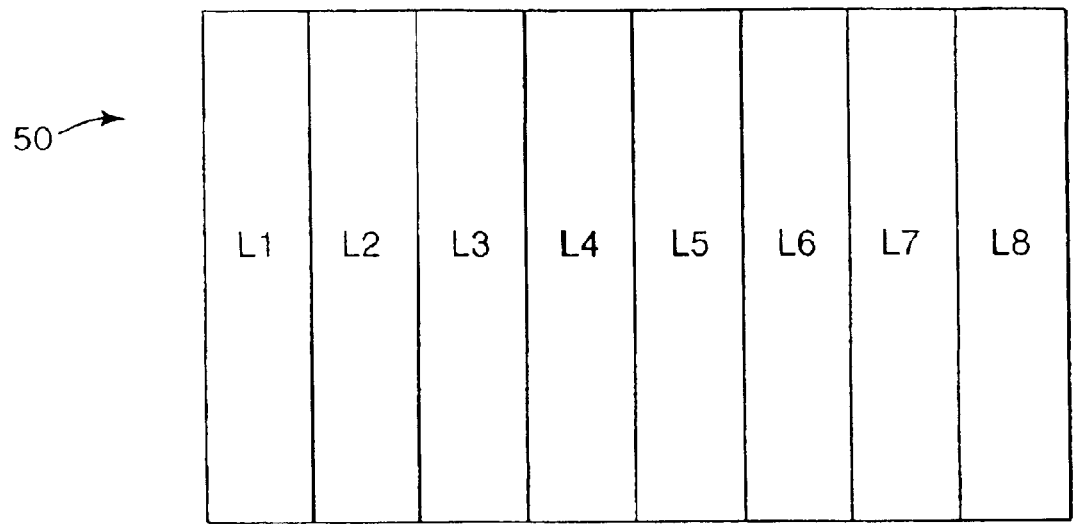
FIGS. 2a and 2b are diagrammatic illustrations of left and right images from which composite images of the present invention are created.
Figure 2B:
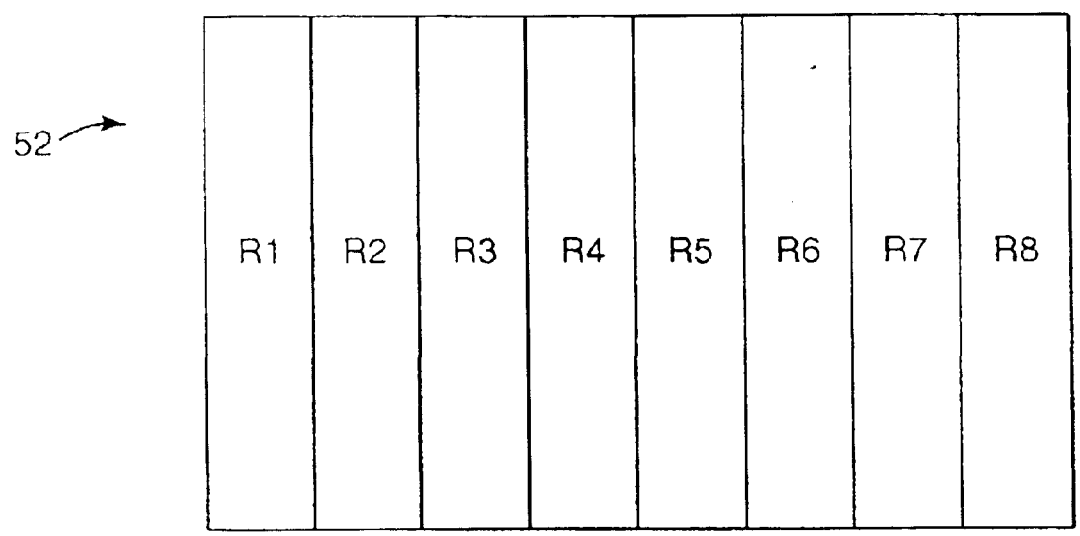

FIGS. 2a and 2b illustrate complete images 50 and 52 which have been taken, for example, by using a camera. Left image 50 represents an image of a subject from the perspective of a person's left eye, while right image 52 represents an image of the same subject from the perspective of the person's right eye. One way in which to obtain these images is to provide two cameras positioned a distance apart approximately equal to the distance between average person's eyes, e.g. about 80 millimeters. The two cameras take images of the same subject, where left image 50 is obtained by the left camera and right image 52 is obtained by the right camera. Due to the distance between the cameras, the two images are not identical, but reflect the parallax from their different vantage points. Other methods can also be used to obtain these images.

For example, if digital cameras are used, each image 50 and 52 is made up of a grid of pixels. Since columns of pixels are of importance to the present invention to providing the strips 30 and 32 in the displayed images, the vertical columns of pixels in each image have been labeled as L1, L2, L3, etc. (for left image 50) and R1, R2, R3, etc. (for right image 52). These columns run the entire height of the image. Pictures taken from analog cameras can similarly be digitized into digital images having columns of pixels.

Figure 3:
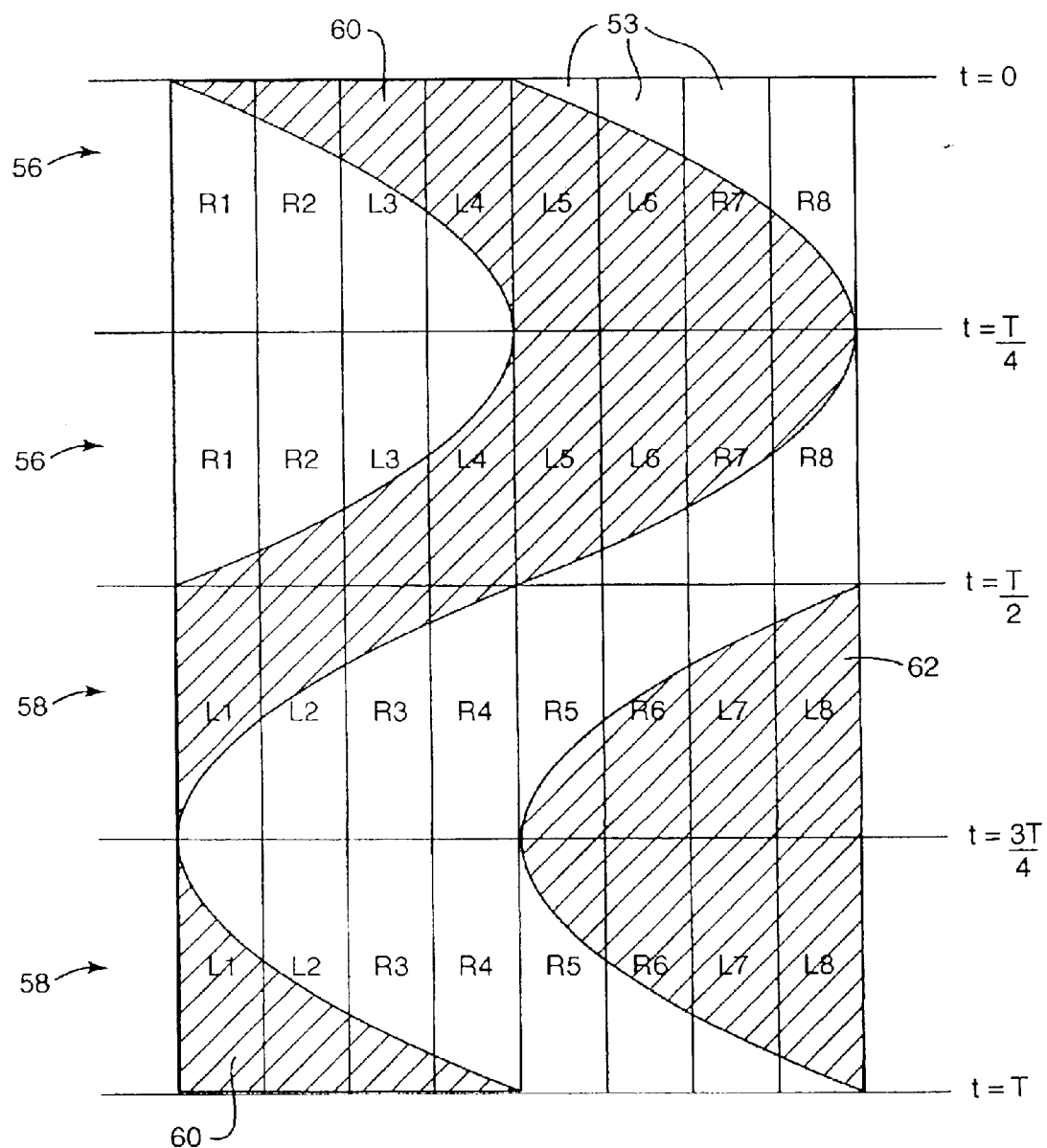
FIG. 3 is a diagrammatic illustration of displayed composite images and blocking portions of the blocking grid moving in front thereof.

FIG. 3 is a diagrammatic illustration of composite images which have been created from the images 50 and 52 of FIGS. 2a and 2b. FIG. 3 shows an arbitrary section of the display screen 18. A first composite image 56 is represented by pixel columns 53 (similar to the pixel columns of FIGS. 2a–b), where the image 56 is created by providing two pixel columns from the right image 52, followed by four consecutive pixel columns from the left image 50, followed by the next two pixel columns from the right image 52, and then repeating this structure across the rest of the composite image. For example, composite image 56 provides pixel columns R1 and R2, followed by columns L3, L4, L5, and L6, followed by columns R7 and R8, and so on.

An image strip, such as one of the image strips 30 or 32 as shown in FIG. 1, is therefore four pixels wide in this example, which should correspond approximately to the amount of image that is visible to an eye of the viewer between blocking strips of the grid 24. When composite image 56 is displayed by the display device 12, the viewer's left eye is only able (approximately) to see the "L" columns through the grid 24, while the right eye is only able (approximately) to see the "R" columns.

Other image strip (and blocking strip) widths can be used in other embodiments. The number of pixels corresponding to the width required to provide the desired blocking effect may depend on the resolution of the images, the actual width of the blocking strips of the grid 24, and/or other factors.

The first composite image 56 is displayed at time t=0 (this example takes place after all initialization has taken place for the system). The composite image 56 is continued to be displayed through the time t=T/4 to time T/2, where T is the period of motion of the oscillating blocking grid 24 and the period of the repeating cycle of the changing composite images. At time t=T/2, the displayed image is changed to composite image 58 that is made similarly using the pixel columns of original images 50 and 52 that were unused in composite image 56. Thus, image 58 starts with pixel columns L1 and L2, followed by four pixel columns R3, R4, R5, and R6, followed by columns L7, and L8, and so on. This is the complement of composite image 56, providing the other half of the image strips omitted from image 56. The composite image 58 is displayed through time t=3T/4, and until time t=T.

This embodiment of the invention operates by alternating the display of composite images 56 and 58 in accordance with the oscillation of the blocking grid 24. Thus, after time t=T, composite image 56 is again displayed and the time is reset to t=0.

For example, the blocking grid crosses the neutral position at time=0, moving to the right. In the example of FIG. 3, a blocking strip of the grid is positioned over the four leftmost pixel columns of image 56 (R1, R2, L3, and L4) in this neutral position, and the opening to the right of that blocking strip allows pixel columns L5, L6, R7, and R8 to be momentarily seen by the right eye of the viewer. The shaded area 60 represents the moving position of the blocking strip as the blocking grid is oscillated in front of the composite images. The blocking strip 60 and opening allow the shown pixels to be momentarily seen by the right eye of the viewer; the left eye view would be similar but reversed as far as which pixels are blocked and seen (i.e., the shaded portion would start in front of the rightmost four pixel columns).

As the time t increases from t=0, the blocking strip 60 moves toward the right as shown. By the time that t=T/4, the blocking strip has been moved over the central pixel columns to end up covering L5, L6, R7, and R8. During this motion, the pixel columns R1, R2, R7 and R8 were exposed to the viewer's right eye for most of the time while the left eye pixel columns were mostly covered during that time; this allows the right eye to see its intended pixel columns for most of the movement of the grid 24.

At time t=T/4, composite image 56 is continued to be displayed, but the blocking grid 60 has reached a limit to movement and is moved back to the left. By the time the blocking strip 60 reaches the left four pixel columns at t=T/2, the blocking strip has passed over all of the eight shown pixel columns, but is covering the middle four pixel columns L3–L6 the longest, which correctly blocks the right eye from seeing the left eye pixel columns for most of the time.

At t=T/2, the grid 24 is again at its neutral position, and the displayed image is changed to composite image 58. The blocking strip 60 continues to move left, and covers the pixel columns L1 and L2 longer than the pixel columns R3 and R4, as desired. Meanwhile, the next blocking strip positioned to the right, represented by shaded area 62, moves left over the pixels R5, R6, L7, and L8, and covers the pixels L7 and L8 for most of the time, as desired.

At t=3T/4, the blocking grid has reached its other limit to its motion and blocking strip 60 has moved over pixel columns (not shown) to the left of column L1, so that pixel columns L1, L2, R3, and R4 are unblocked and columns R5, R6, L7, and L8 are blocked. As time advances and the blocking strips move back to the right, blocking strip 60 moves over columns L1, L2, R3, and R4, but covers the columns L1 and L2 the longest so that the right eye will mostly see the columns R3 and R4. Meanwhile, blocking strip 62 moves to the right as well, covering columns L7 and L8 the longest during this time and allowing the right eye to mostly see R5 and R6. At time t=T, the blocking strips have reached the neutral position, and the image display and grid motion begins again as at time t=0.

Using this method, the correct eye sees its intended view for most of the time. There is a distorting effect as the openings or unblocked portions between the blocking strips of the grid 24 move between image strips, revealing some portions of the pixel columns intended for the other eye. However, this effect does not detract greatly from the three dimensional effect because of the sinusoidal motion of the grid 24, i.e., more than half of the correct image is seen by each eye for about two-thirds of the time.

Other methods can also be used. For example, other pixel patterns can be provided. The pixels assigned to each composite image should be selected so that each eye sees the correct picture for most of the time that the image is displayed, considering the motion of the grid 24. For example, in composite image 56, pixel L3 can be replaced by R3 since during about one-half of the period T, the right eye sees the wrong pixel more than one-half of that time.

Also, the movement of the grid can be optimized so that even more area in the intended pixel columns is able to be viewed by the intended eye than in the example shown. For example, the blocking strips can be made to move beyond the limits shown in FIG. 3 so that more area of pixel columns is exposed to the correct eye.

The above examples are for providing a still three-dimensional image; however, providing a motion picture, movie, or animation using the present invention can also be accomplished. For example, a movie consists of a number of individual frames, where each frame is an image. Thus, each frame of the movie can be displayed by displaying the first composite image, then the second composite image at the appropriate frequency matching the oscillation of the blocking grid 24. The next frame of the movie would then be displayed similarly, with two composite images. If a frame is desired to be visible for a longer period of time, the two composite images can be alternated on the screen for the desired longer period of time at the appropriate frequency, until the next frame is displayed by alternating its composite images for the same period of time, and so on.

Figure 4:
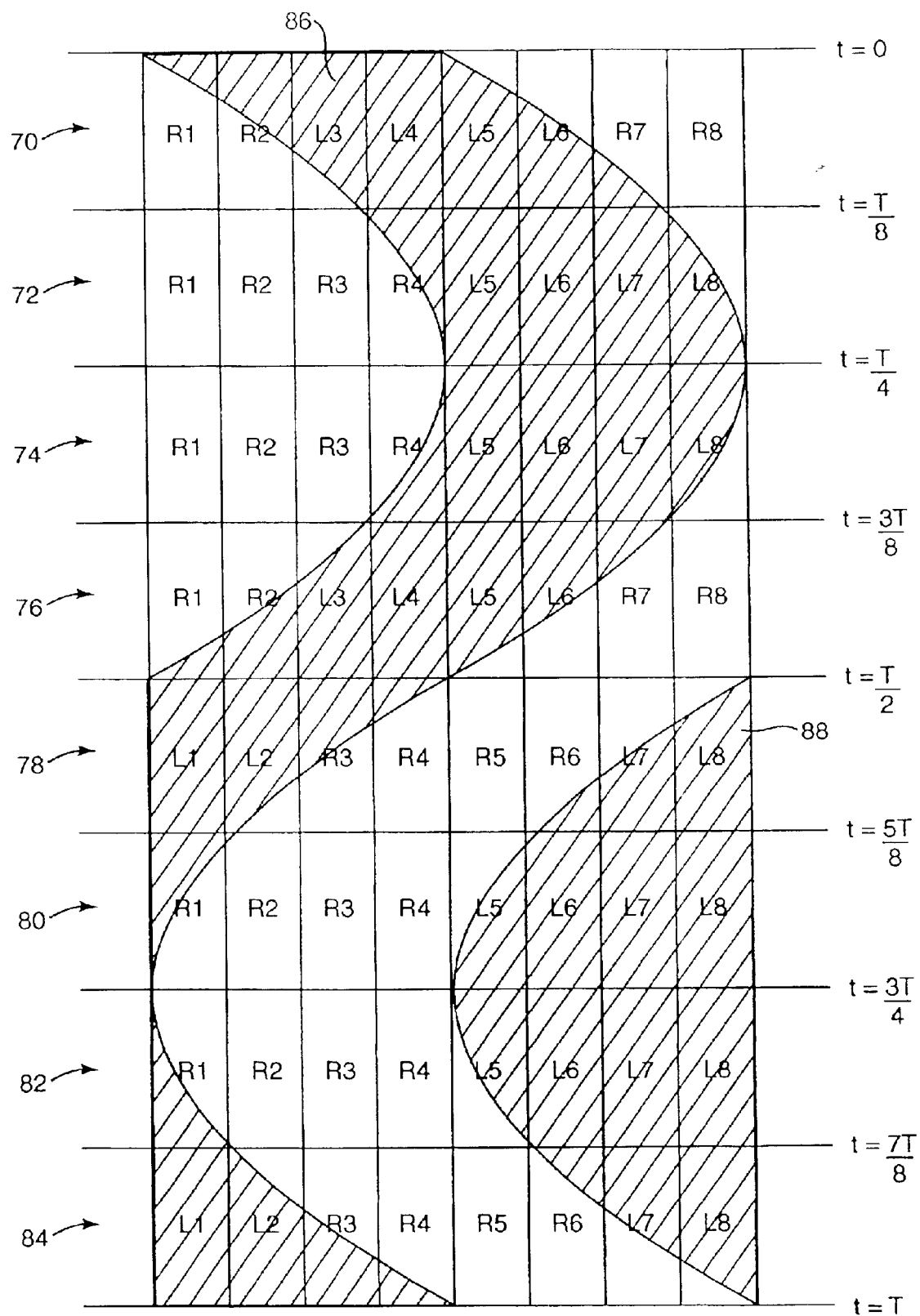
FIG. 4 is a diagrammatic illustration of another embodiment of displayed composite images and blocking portions of the blocking grid moving in front thereof.

FIG. 4 is a diagrammatic illustration showing a different embodiment of the present invention, in which more than two composite images are used and changed at more frequent intervals in displaying the image on display screen 18. The minor distorting effect described above with respect to FIG. 3 can be further minimized by displaying composite images that have pixel columns that more closely follow the motion of the blocking grid 24. Instead of having only two composite images 56 and 58 being displayed to portray a 3-D image, more composite images can be displayed for the 3-D image. In the example of FIG. 4, three different composite images are created from the left and right images 50 and 52, and displayed in a particular sequence in eight divisions of the same time period in which the two images of FIG. 3 were displayed in the previous embodiment. This embodiment thus operates best when a display device 12 is used that is capable of refreshing images at least four times the alternating rate needed for the embodiment of FIG. 3. In other embodiments, a different amount of composite images can be used, and the period can be divided up in other ways, as desired.

FIG. 4 illustrates eight composite images 70, 72, 74, 76, 78, 80, 82, and 84, which are to be repeatedly displayed in the sequence shown over a period matching the period of oscillation of the blocking grid 24 (some of these composite images are identical, so that in actuality only three different images are needed). Similarly to the embodiment of FIG. 3, image 70 can be displayed at time t=0, when the grid 24 is at its neutral (rest) position, and a blocking strip 86 covers the left pixel columns R1, R2, L3 and L4. As with FIG. 3, the blocking strips 86 and 88 are shown in the view of the right eye of the viewer. As the grid is moved to the right, the blocking strip 86 covers mostly the left-eye columns L3–L6 and leaves most of the right-eye columns R1, R2, R7, and R8 unblocked for viewing.

At time t=T/8, the displayed image is changed to composite image 72 to accommodate the new position of the grid 24. As the grid continues to move to the right, the strip 86 mostly covers the pixel columns L5–L8 which are positioned at the right, and leaves the right-eye columns R1–R4 mostly open for viewing. At time t=T/4, the displayed image is changed to composite image 74, which is the same as composite image 72, and the grid has reached its rightmost limit to motion. As the grid then moves back left, blocking strip 86 again covers the left-eye pixel columns L5–L8 most of the time.

At time t=3T/8, the image is changed to composite image 76 (which is the same as composite image 70), and the blocking strip 86 continues to move to the left, covering mostly the pixel columns L3–L6 in the middle section as the time reaches t=T/2. At t=T/2, the blocking strip 86 has returned to the neutral position, and the displayed image is changed to composite image 78. The grid is then continued to be moved to the left, where blocking strip 86 mostly covers pixel columns L1 and L2 and the next-rightmost blocking strip 88 moves into the area and mostly covers the columns L7 and L8, leaving the columns R3–R6 viewable most of the time. At time t=5T/8, the displayed image is changed to composite image 80, and the strip 86 continues to move off the shown columns while the strip 88 covers the columns L5–L8. At time t=3T/4, the composite image 82 is displayed, which is the same as image 80. The grid 24 has reached its left limit at this time, and then begins to move right, so that the strip 86 comes back to the shown pixel columns and the strip 88 starts to move away, but still covers the columns L5–L8. At time t=7T/8, the composite image 84 is displayed while strip 86 moves mostly over columns L1 and L2 while strip 88 moves mostly over columns L7 and L8 as it exits the shown pixels. The time is then at t=T, which is the same as t=0 when the sequence is repeated, i.e., when the composite image 70 is again displayed.

This embodiment allows the displayed pixels of the composite images to more accurately follow the position of the blocking strips and openings in the grid 24 as the grid is moved, thus allowing a greater percentage of the correct images for each eye to be displayed for a greater amount of time than in the embodiment of FIG. 3. The use of more composite images and divisions in the time period maximizes the time that each eye sees its correct image, thus reducing any distortion caused by the motion of the grid.

Figure 5:
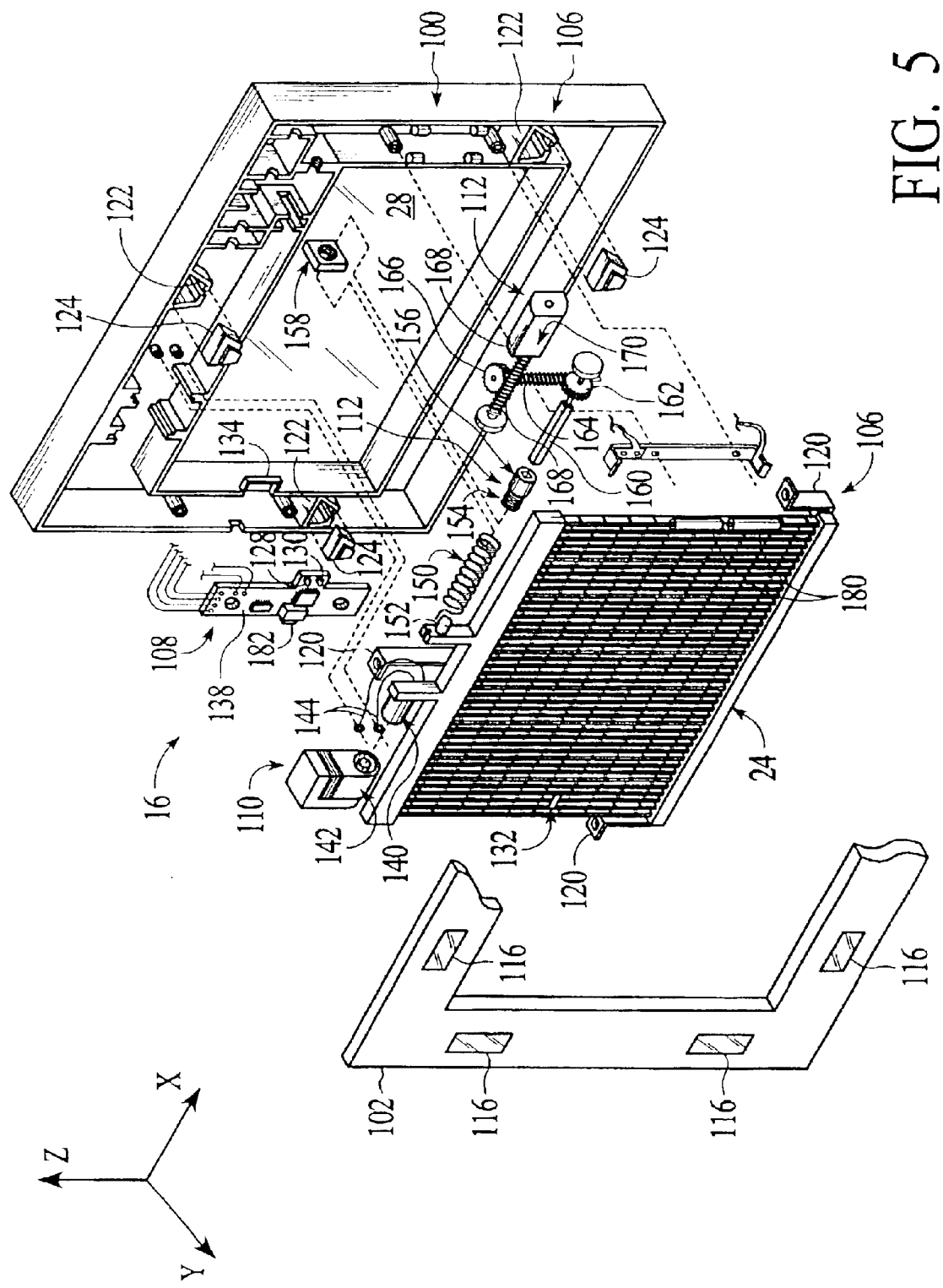
FIG. 5 is a perspective exploded view of one example of an implementation of the blocking device of the present invention.

FIG. 5 is an exploded view of one example of an implementation of the blocking device 16 of the present invention. Blocking device 16 includes a frame 100, blocking grid 24, a back panel 102, protective shield 28, a flexure assembly 106, a detection assembly 108, a drive assembly 110, a flexure adjustment assembly 112, a controller 138, batteries 180, and a power switch 182.

Frame 100 holds and supports the blocking grid 24 within its structure. The grid 24 can oscillate in two directions along the x-axis within the frame 100, while the frame 100 remains stationary. Frame 100 includes a back panel 102 which is positioned on the display screen side of the grid 24 and encloses the grid within the frame 100. An attachment device is preferably provided on panel 102 to allow the panel and frame to be attached to the display device 12. For example, steel areas 116 can be adhered to the back panel 102 which correspond to portions of magnetic tape that are adhered to the front of the housing of the display device 12, so that the frame 100 can be attached to magnetic tape on the display device 12. Other adhesives or attachment devices can also be used. The protective shield 28 is a glass or plastic transparent material that protects the grid 24 within the frame 100 and allows a viewer to see into the frame 100 and through the unblocked portions of the grid 24. Frame 100 also preferably includes various fittings and receptacles for holding the components of the device 16 in place.

Blocking grid 24 is shown having a plurality of blocking strips alternating with open spaces that allow the viewer to see the images displayed behind the grid, as described with respect to FIG. 1. The grid 24 is able to move laterally a short distance along the x-axis in either direction from a neutral position. In the described embodiment, this motion is allowed by the flexure assembly 106, which includes a plurality of flexure members 120. Members 120 can be flexible leaf springs made of metal, plastic, or other suitable material. One end of each flexure member 120 is attached to the blocking grid 24, and the other end is rigidly coupled to the frame 106 in, for example, receptacles 122. Each receptacle 122 can securely receive a mating portion 124, to which a corresponding flexure 120 is attached; for example, a portion of a flexure 120 can be pushed into a receiving slot of a mating portion 124.

Detection assembly 108 is used to provide the controller 138 with information regarding the motion of the blocking grid and the frequency of the display so that the driving of the grid is optimized and so that the display of images and the grid motion are synchronized. Assembly 108 includes a first photodetector 128 which is used to track the motion of the blocking grid 24 and provide information to the controller 138. Photodetector 128 is positioned to receive light from the display of the display device 12 through the blocking grid 24. When the grid 24 is in its initial, rest position, the photodetector 128 receives the maximum amount of light, i.e., the photodetector is not blocked by any portion of the blocking strips of the grid 24. Preferably, a dedicated white or light-colored part of the display is aligned with the photodetector 128 to provide maximum illumination. When the drive assembly 110 moves the grid (described below), a blocking strip of the grid 24 is gradually moved in front of the photodetector 128, cutting off illumination to the photodetector. When the grid is at a limit to its motion, the photodetector 128 receives a particular threshold level of illumination. Thus, by monitoring this photodetector 128, the computer 14 can determine the position of the grid 24. This is described in greater detail with respect to FIG. 6.

Detection assembly 108 can also include a second photodetector 130, which is used to determine the frequency of the display of composite images on the display device 12. Photodetector 130 is positioned to detect the light from the display device 12, and is oriented with a window 132 in the grid. The window 132 allows the photodetector 130 to never be blocked by the blocking strips of the grid 24 (note that photodetector 128 is not aligned with this window 132). Preferably, a corresponding "frequency detection area" of the displayed image on the display screen alternates from a light color, such as white, to a dark color, such as black, at the same frequency which the composite images are displayed. The photodetector 130 is able to detect the difference in light and thus distinguish between the two colors. Thus, if two composite images are being alternately displayed as in FIG. 3, the frequency detection area is changed between light and dark whenever a new composite image is displayed. If more than two composite images are displayed, as in FIG. 4, then the frequency detection area is changed between light and dark whenever a full cycle of composite images is complete, e.g., for FIG. 4, whenever the first composite image of eight images is displayed. Thus the photodetector 130 can be used to determine the image display frequency so that the frequency of the grid 24 can be matched to the images, as explained with reference to FIG. 6.

A cover area 134 on the frame 100 can be positioned between the viewer and the dedicated areas of the display used by the first and second photodetectors 128 and 130. Cover area 134 can thus cover the light area used by photodetector 128 and the frequency detection area used by photodetector 130, as well as the photodetectors themselves, so that the viewer cannot see these areas and detectors.

The above-described embodiment assumes that the blocking device 16 cannot communicate directly with the display device 12 or computer 14. This allows a user to easily install the device over an existing display device, and also more easily allows a remotely-located computer 14 to be used with a local display (e.g., when computer 14 is connected to the display device 12 via a computer network). Alternatively, in a different embodiment, the blocking device 16 can include a communication channel (e.g., a wire, or wireless transmission) to the computer 14, where the display frequency of the images is known to the computer and thus could be directly provided to the controller 138 of the blocking device 16, thus obviating the need for the second photodetector 130. Or, in embodiments having communication between computer 14 and blocking grid 16, the displayed image frequency can be matched to a measured frequency of the grid, rather than the other way around as described for this embodiment.

In other embodiments, other types of sensors besides photodetectors can be used to determine the position of the grid 24 with respect to its motion limits, and the frequency of the images on the display screen. Sensors can also be placed in locations other than those shown in the embodiment of FIG. 5.

A controller 138 can be included on a circuit board with the detection assembly 108, or can be provided elsewhere in the blocking device 16. Controller 138 initializes and controls the components of the blocking device 16, as described in greater detail with respect to FIG. 6. Controller 138 can be a microprocessor, state logic, or other microcontroller, and interface with appropriate electronic components included in the blocking device 16, such as memory, analog-to-digital controllers, digital-to-analog controllers, I/O components (if necessary), etc.

Drive assembly 10 is used to move the blocking grid 24. In the described embodiment, the drive assembly includes a voice coil 140 which is coupled to the blocking grid 24, and a receiving magnet assembly 142 which is grounded to the frame 100. When voice coil 140 is positioned in magnet assembly 142, and when current is applied to the voice coil via wires 144, linear force is applied to the voice coil along the x-axis due to the electromagnetic interaction between current and magnets, thus applying force to the grid 24 and causing the grid to move along the x-axis. Force in the described embodiment is applied to the grid in only one direction, but can alternatively be applied bi-directionally.

Drive voltage pulses of constant voltage can be applied to the voice coil to provide just enough force to keep the grid oscillating at a desired amplitude. The pulse width can be varied to reduce or increase the time during which force is applied to the grid. The timing of the drive pulse is determined by the threshold signal from photodetector 128 so that the frequency of the grid's oscillations can be changed without the electrical and mechanical periods working against each other. In addition, harmonic balancing methods, known to those of skill in the art, can be used in combination with the mass of the frame to eliminate any undesirable vibrations or noise from the system; for example, weight can be added to the frame 100, or a complementary oscillation can be introduced to cancel out undesired vibrations.

Flexure adjustment assembly 112 is used to adjust the natural frequency of oscillation of the blocking grid 24 to match the frequency of the images displayed on the display screen. To allow the minimum amount of power to be used, the natural (or fundamental) frequency of the grid, based on the compliance of the flexures and primary spring, mass of the grid, etc., should match the frequency of composite images displayed. Since the mass of the grid is constant and difficult to change, the spring rate (spring constant) or compliance of the spring system of the grid is preferably changed.

Flexure adjustment assembly 112 includes several components to allow the spring rate of the grid to be changed. In the described embodiment, the assembly adjusts the number of active turns of a primary spring 150 to change the natural frequency of the grid system. The primary spring acts as another flexure provided between the frame 100 and the grid 24 to allow the oscillations to take place. Primary spring 150 has one end coupled to the grid 24 at a thread 152, where the end of the spring is tightly screwed over the threads and the end of the spring snaps in place to prevent rotation of the spring. The spring 150 can be, for example, a helical steel spring having a mean diameter of 0.5 inches, made with 0.091 inch diameter wire and having 18.5 active turns, which will provide a natural frequency for the grid of about 60 cycles/second if the weight of the grid structure is about 1.88 oz. Adding or removing one active turn from this type of spring will change the natural frequency about 2.7%. Of course, other sizes and types of springs and other weights of grid can be used in other embodiments.

Adjustment of the active turns of the primary spring 150 is accomplished by screwing an arbor screw 154 into the other end of the primary spring 150 (the arbor screw can have the same geometry as the threads 152 on the other end of the spring 150, except that the fit should not be so tight that the screw cannot be easily turned). The arbor screw 154 includes a thread pitch that matches the winding pitch of the primary spring and the thread profile is slightly larger than the spring wire diameter. The arbor screw 154 is coupled to a larger-diameter screw portion 156 which is threaded to fit an arbor nut 158, where nut 158 is fixed to the frame 100. A square hole in screw portion 156 receives a rotating member 160 having a square or rectangular cross-section, which is in turn coupled to a worm gear 162. Gear 162 mates with a worm gear 164, and is in turn driven by gear 166. Worm gear 164 is fixed to gear 166. Gear 166 mates with a worm gear 168, which is rotated by a motor 170. Thus, in operation, motor 170 is activated to rotate worm gear 168, gear 166, worm gear 164, and gear 162, which causes member 160 to rotate the screw 156/154. This causes the arbor screw 154 to remove or add active turns to the primary spring as the spring is wound or unwound on the threads of the arbor screw 154, thereby adjusting the natural frequency of the grid system. The screw 154/156 moves linearly along the member 160 as it rotates, since the screw 154/156 is threaded through the grounded arbor nut 158. This double worm gear system can have, for example, two 15 to 1 worm gears, providing a combined 225 to 1 reduction ratio from the motor 170 to the arbor screw 154. Other ratios can be used in other embodiments.

Blocking device 16 also preferably includes a power source, such as batteries 180, which can be connected to the motor 170, voice coil 144, and detection assembly 108 to power to the components described above. Batteries 180, for example, can be positioned within one side of the frame 100 as shown. Other power sources can also be used, including power from a power socket, computer 14, or display device 12. The blocking device 16 can also include a power switch 182 which, when turned on by a user, causes the device 16 to initialize and start operating.

Figure 6:
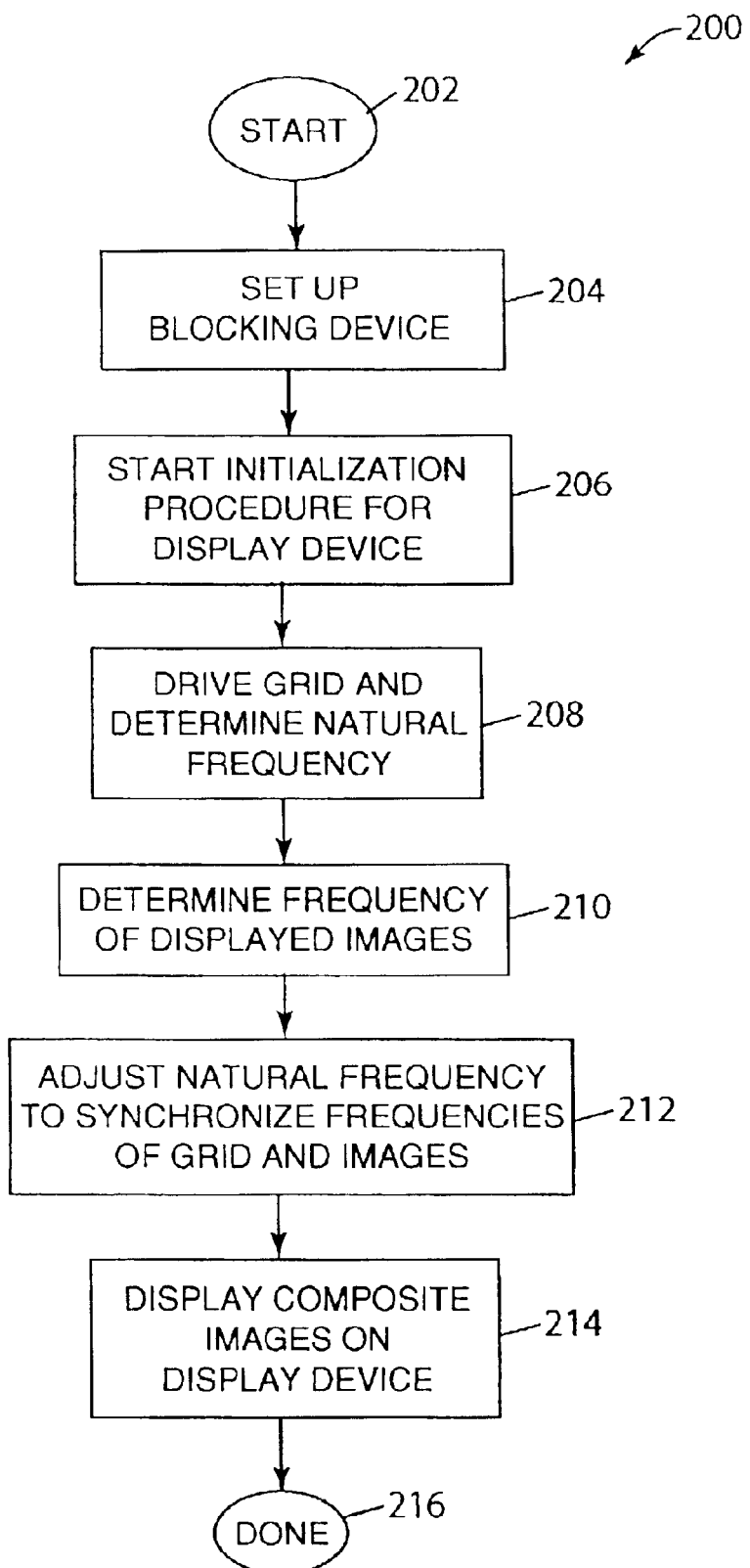
FIG. 6 is a flow diagram illustrating a method of the present invention for implementing three-dimensional images.

FIG. 6 is a flow diagram illustrating a method 200 of the present invention for implementing three-dimensional images. Appropriate steps of the method can be implemented in software or firmware running on the computer 14 or controller 138 of the blocking device, and/or can be implemented in hardware as is well known to those of skill in the art. Software instructions can be stored on a computer readable medium, such as memory, hard disk, CD-ROM, or other storage medium.

Process 200 starts at 202, and in step 204, the blocking device 16 is set up on the display device. The user attaches the blocking device 16 using an attachment device described above, such as magnetic strips, so that the transparent protective shield 28 is approximately centered on the display screen 18 of the display device 12. An alignment pattern is preferably displayed by the display device 12 to assist in this purpose. The alignment pattern is preferably a grid pattern having image strips that match the grid pattern of the blocking device 16. For example, the alignment pattern can be a series of alternating dark and light vertical strips having approximately the same dimensions and spacing as the vertical blocking strips of the grid 24. The user then laterally and rotationally positions the blocking device 16 so that the grid pattern visually matches the alignment pattern, e.g. so that the user can see all of one color of the displayed strips (such as the dark color) with one eye and all of the other color (such as the light color) of displayed strips with the other eye (when the user is seated at the proper distance). The displayed image strips of the alignment pattern can be a different color than the color of the blocking grid strips so that the user can more easily determine when they are aligned. After this procedure, the blocking device is in an aligned position.

In step 206, an initialization procedure is begun. The display device is commanded by the computer 14 (and user) to display a pattern having a white (or other light) pattern in at least the area that is detectable by the first photodetector 128. This area can be displayed only in the initialization procedure; or, this area can be included in every composite image that is displayed, in which case the composite images can begin to be displayed immediately at the desired frequency (and step 214 may be skipped). The power switch 182 is then turned on by the user, and the controller 138 starts to oscillate the grid 24.

In step 208, the blocking grid 24 is oscillated and the current natural frequency of the grid is determined. This is described in greater detail with respect to FIG. 7. In step 210, the frequency of the displayed images is determined. In the described embodiment of FIG. 5, this is accomplished by using second photodetector 130 to detect the light from the frequency detection area of the image through a window in the grid 24, which alternates light and dark at the frequency of display of the composite images. Steps 206 and 208 can be performed in any desired order or substantially simultaneously.

In step 210, the natural frequency of the grid 24 is adjusted to synchronize the frequencies of the grid and the display. This step is described in greater detail with respect to FIG. 8.

In step 212, the display of the 3-D image is commenced by displaying the composite images, as described above with reference to FIGS. 2a–4h (unless these images are already being displayed in step 206). The viewer, standing at the appropriate distance and position, can view the 3-D images. A motion picture can also be provided by sequencing sets of alternating composite images in this step. After display, the process is complete as indicated in step 214.

Figure 7:
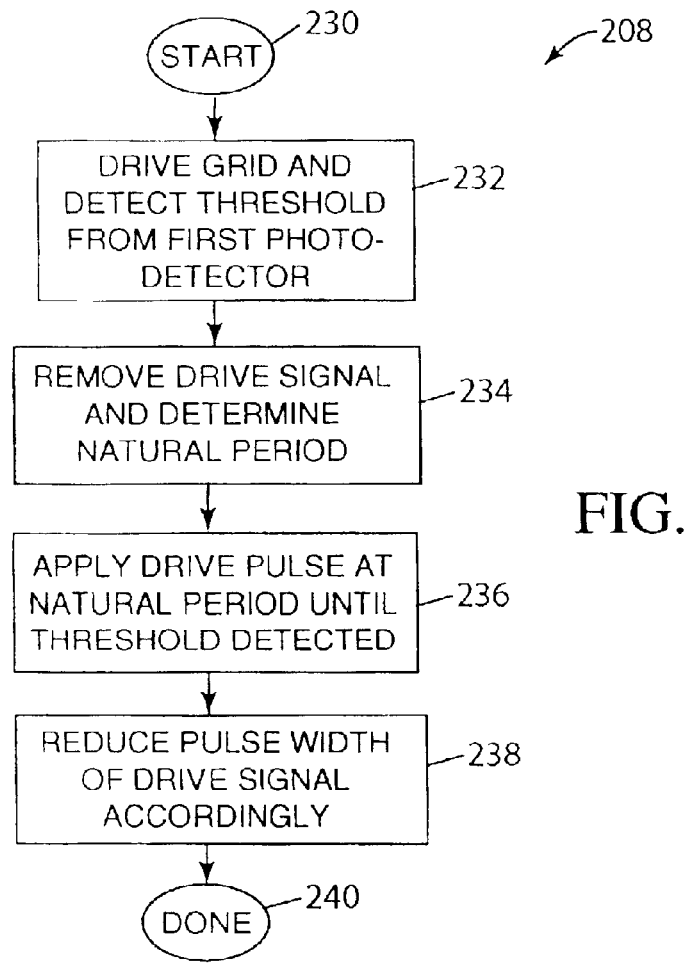
FIG. 7 is a flow diagram illustrating a step of FIG. 6, in which the natural frequency of the blocking grid is determined.

FIG. 7 is a flow diagram illustrating step 208 of FIG. 6, in which the natural frequency of the grid 24 is determined. This method is preferably implemented by the controller 138 on the blocking device, but in alternate embodiments can be implemented by other devices, such as the computer 14. The method starts at 230, and in step 232, after the power switch 182 has been turned on, the controller 138 drives the grid with the voice coil 142 in one direction at a predetermined current level. In the described embodiment of FIG. 5, the grid 24 starts out in a neutral position so that the first photodetector 128 is fully aligned with a space between the blocking strips of the grid, so that the photodetector can detect the highest intensity of light from the corresponding dedicated light area on the display. As the grid 24 is moved away from the neutral position and a blocking strip is moved in front of the photodetector 128, the intensity of light detected by the photodetector is reduced. When the grid reaches the furthest desired position, the light detected by the photodetector 128 is at a threshold value. Thus, when this threshold value is detected in step 232, the grid is at a desired maximum limit (amplitude) to its travel. The grid moves well beyond this desired limit due to the flexibility of the grid flexures and the momentum induced by this first voltage pulse.

In step 234, the drive signal is removed so that the grid 24 will move back toward the neutral position at its natural frequency due to the flexibility of the flexures and spring 150. The time it takes for the grid to successively reach its desired limit, when the threshold level is detected, is the natural period of the mechanical system of the grid (flexures, spring, weight, etc.). Since the maximum desired amplitude was exceeded, several cycles of oscillation may be measured.

In step 236, the drive pulse continues to be removed until the time period that the threshold signal is exceeded approaches zero. Now the drive pulse is again applied to the grid to drive it again in a direction toward its limit of travel, until the threshold signal is consistently detected by the first photodetector 128. Since the minimum amount of power is desired to be expended in moving the grid, the lowest amount of power should be used that forces the grid to the position at the threshold level. Therefore, in step 238, the controller reduces the drive signal pulse width to the minimum level needed to allow the grid to reach the threshold level, thereby avoiding overshoot of the grid past the limit and optimizing the power used to drive the grid. The process is then complete at 240.

Figure 8:
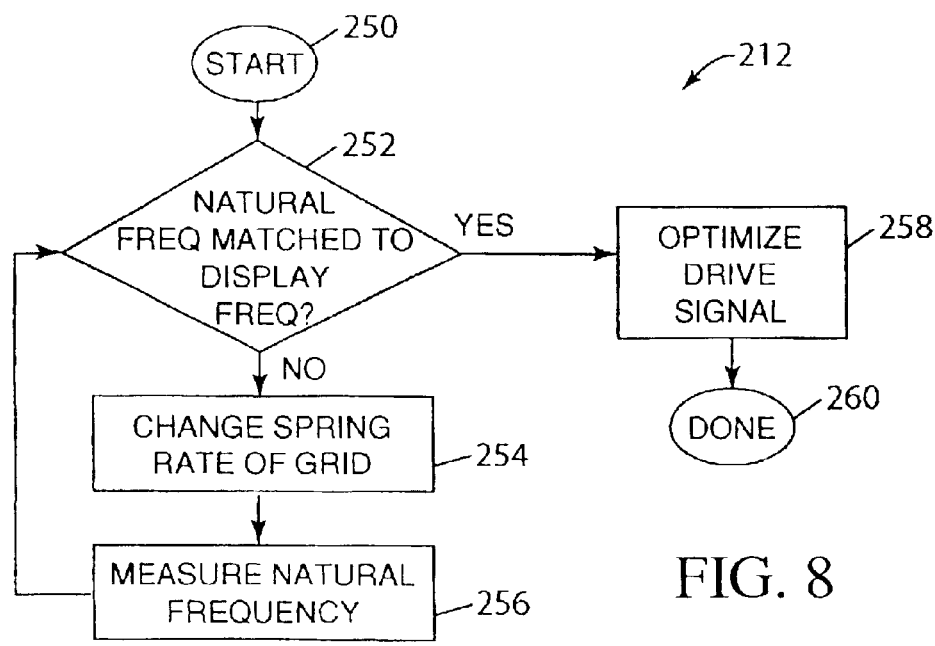
FIG. 8 is a flow diagram illustrating a step of FIG. 6, in which the natural frequency of the oscillation of the grid is matched to the frequency of the display of composite images on the display device.

FIG. 8 is a flow diagram illustrating step 212 of FIG. 6, in which the natural frequency of the oscillation of grid 24 is matched to the frequency of the display of composite images on the display device 12. The process begins at 250, and in step 252 the process checks whether the natural frequency of the grid is matched to the display frequency. If so, the process continues to step 258, described below. If not, in step 254 the controller 138 changes the spring rate of the grid to change the natural frequency. In the described embodiment, this entails activating motor 170 to rotate the arbor screw 154 and change the number of turns in the primary spring 150, thereby changing the spring rate of the spring 150 and the grid, as well as the natural frequency of oscillation. For example, the arbor screw 154 can be rotated by one complete turn to change the natural frequency. The natural frequency can be changed in other ways in other embodiments.

In step 256, the natural frequency of the grid system is again measured. This can be accomplished by moving the grid to its limit until the threshold value is detected by the first photodetector 128, and then removing the drive signal, as described in the procedure of FIG. 7. An alternate embodiment for obtaining natural frequency can measure the time between drive pulses or the time between successive threshold signals. The process then returns to step 252 to check whether the natural frequency matches the display frequency. Once the frequencies match, step 258 is implemented, in which the drive signal is optimized to eliminate overshoot and minimize power consumption, similar to step 238 of FIG. 7; this step can be performed periodically or continually during operation. The process is then complete at 260.

The reading of the display frequency and grid frequency, and the adjustment to match these frequencies, can also be performed periodically during operation of the display system to assure that the devices are synchronized properly.

Although the present invention has been described in accordance with the embodiments shown, one of ordinary skill in the art will readily recognize that there could be variations to the embodiments and those variations would be within the spirit and scope of the present invention. For example, various types of mechanical systems can provide the desired grid oscillation and adjustment of display and/or grid frequencies. Accordingly, many modifications may be made by one of ordinary skill in the art without departing from the spirit and scope of the appended claims.

What is claimed is:

1. An apparatus for allowing the viewing of three-dimensional images using a display device displaying two-dimensional images, the apparatus comprising:
   a blocking grid positioned between the display of the display device and a viewer;
   a spring suspension for allowing the blocking grid to oscillate with respect to a frame supporting the blocking grid; and
   a drive system for oscillating the blocking grid in accordance with the display of a plurality of images, wherein each image is approximately aligned with the grid and each image is structured such that each eye of the viewer sees only a displayed portion of a displayed image intended for that eye, thereby creating a three-dimensional effect.

2. The apparatus of claim 1 wherein the blocking grid includes a plurality of blocking strips spaced apart.

3. The apparatus of claim 2 wherein the blocking strips are arranged vertically.

4. The apparatus of claim 1 wherein the display device includes an approximately flat display screen, and wherein the blocking grid is positioned in front of the display screen.

5. The apparatus of claim 1 wherein the oscillation of the grid corresponds with the display of images wherein each eye of the viewer is blocked from seeing half of the image that is intended for the other eye of the viewer when the grid is moved to one position, and wherein each eye can see the previously blocked half of the image intended for that eye when the grid is moved to another position.

6. The apparatus of claim 1 further comprising a control system for setting the oscillation of the blocking grid to match the display of the plurality of images.

7. The apparatus of claim 6 wherein the control system includes a sensor system for determining the frequency of the display of images.

8. The apparatus of claim 6 wherein the control system includes a sensor system that determines the current frequency of oscillation of the blocking grid.

9. The apparatus of claim 1 wherein the spring suspension includes a plurality of flexure members.

10. The apparatus of claim 1 wherein the spring suspension includes a device that can change the spring rate of at least one spring in the spring suspension to allow the natural frequency of the oscillating grid to be matched to the frequency of the display of images.

11. The apparatus of claim 1 wherein the displayed portions of the plurality of images, seen by the viewer, are displayed to approximately follow a sinusoidal motion of the blocking grid.

12. The apparatus of claim 11 wherein the plurality of images includes three or more different images repeatedly displayed in a particular sequence.

13. The apparatus of claim 1 wherein the blocking grid is oscillated at its natural frequency.

14. A method for providing three dimensional images using a display device capable of displaying two-dimensional images, the method comprising:

(a) creating a plurality of composite images, wherein each composite image includes portions of two separate images, each separate image portraying the perspective of one of the eyes of a viewer;

(b) displaying the composite images on the display device, one at a time, at a display frequency; and (c) oscillating a blocking grid which is positioned between the display of composite images and the viewer such that each eye of the viewer sees only the portions of the composite images that are intended for that eye, wherein the oscillation frequency of the blocking grid is adjusted by adjusting a spring rate of a spring system of the blocking grid.

15. The method of claim 14 wherein each composite image includes alternating portions of two separate images.

16. The method of claim 14 wherein each composite image has portions intended for each eye of the viewer, wherein corresponding portions in different composite images have different positions in their respective composite images.

17. The method of claim 14 wherein the oscillation of the grid allows each eye of the viewer to see an image for that eye displayed over a display area of the display device.

18. The method of claim 14 wherein the plurality of composite images are two composite images alternating on the display at the display frequency.

19. The method of claim 14 wherein the plurality of composite images are a repeating set of more than two composite images displayed in a particular sequence.

20. The method of claim 14 wherein the portions of the composite images are vertical strips alternating between a portion intended for one eye of the viewer and a portion intended for the other eye of the viewer.

21. The method of claim 14 further comprising sensing the frequency of display of the composite images and adjusting the frequency of the oscillation of the blocking grid to match the display frequency.

22. The method of claim 14 wherein the display of composite images is repeated to provide a static display of a subject of the composite images.

23. The method of claim 14 wherein different composite images are sequenced to provide a motion picture display of images.

24. The method of claim 14 wherein the portions of the composite images seen by the viewer are displayed approximately follow a sinusoidal motion of the blocking grid.

25. The method of claim 14 wherein the blocking grid is oscillated at its natural frequency.

26. A system for providing three-dimensional images, the system comprising:

a display device capable of displaying two-dimensional images, wherein the display device is caused to display a plurality of composite images, wherein each composite image includes alternating portions of two separate images, each separate image taken from the perspective of one of the eyes of a viewer;

a blocking device positioned between the display device and the viewer, the blocking device including a grid, wherein the blocking grid is oscillated in accordance with the display of the composite images, and wherein each composite image is structured and aligned with the grid such that each eye of the viewer sees only a displayed portion of the composite images intended for that eye through spaces in the grid, thereby creating a three-dimensional effect; and a spring suspension for allowing the blocking grid to oscillate with respect to a frame supporting the blocking grid.

27. The system of claim 26 wherein the grid includes a plurality of blocking strips spaced apart, and wherein each eye of the viewer sees only a displayed portion of the composite images intended for that eye through spaces between the blocking strips.

28. The system of claim 26 wherein the display device includes an approximately flat display screen, and wherein the blocking grid is positioned in front of the display screen.

29. The system of claim 26 wherein the oscillation of the grid corresponds with the display of images wherein each eye of the viewer is blocked from seeing half of the image that is intended for the other eye of the viewer, and wherein each eye can see the previously blocked half of the image intended for that eye when the grid is at a different position.

30. The system of claim 26 further comprising a control system for setting the oscillation of the blocking grid to match the display of the plurality of images.

31. The system of claim 30 wherein the control system is provided on the blocking device, and wherein the control system includes a detection system for determining the frequency of the display of images and for determining the current frequency of oscillation of the blocking grid.

32. The system of claim 26 wherein the spring suspension includes a device that can change the spring rate of at least one spring in the spring suspension to allow the natural frequency of the oscillating grid to be matched to the frequency of the display of images.

33. The system of claim 26 wherein the displayed portions of the plurality of images, seen by the viewer, are displayed to approximately follow a sinusoidal motion of the blocking grid.

34. The system of claim 33 wherein the plurality of images includes three or more different images repeatedly displayed in a particular sequence.

35. The system of claim 26 wherein the blocking grid is oscillated at its natural frequency.

* * * * *